United States Patent [19]
Shimizu

[11] 3,874,770
[45] Apr. 1, 1975

[54] RETROFOCUS TYPE WIDE-ANGLE PHOTOGRAPHIC LENS

[75] Inventor: Yoshiyuki Shimizu, Kawasaki, Japan
[73] Assignee: Nippon Kogaku K.K., Tokyo, Japan
[22] Filed: May 31, 1973
[21] Appl. No.: 365,715

[30] Foreign Application Priority Data
June 7, 1972 Japan.............................. 47-55975

[52] U.S. Cl................................ 350/214, 350/215
[51] Int. Cl. .............................................. G02b 9/64
[58] Field of Search........................... 350/214, 215

[56] References Cited
UNITED STATES PATENTS
3,507,559    4/1970    Mori ................................. 350/214

Primary Examiner—John K. Corbin
Attorney, Agent, or Firm—Shapiro and Shapiro

[57] ABSTRACT

A retrofocus type wide-angle photographic lens system having a back-focus longer than the total focal length thereof includes, in the direction from the diaphragm toward the image side, a biconcave lens component, a positive meniscus lens component with its concave surface facing the diaphragm, and a first positive lens component, and in the direction from the diaphragm toward the object side, a biconvex lens component, a second positive lens component, and a negative meniscus lens member with its concave surface facing the diaphragm. The second positive lens has a center thickness greater than twice that of the negative meniscus lens member and greater than three times the air spacing between the second positive lens and the biconvex lens. The surface of the second positive lens which is nearer to the diaphragm has a refractive power less than that of the surface of the biconvex lens which is remote from the diaphragm. The surface of the second positive lens which is remote from the diaphragm has a radium of curvature greater than that of a plane aplanatic with respect to oblique rays passed through the negative meniscus lens member.

7 Claims, 16 Drawing Figures

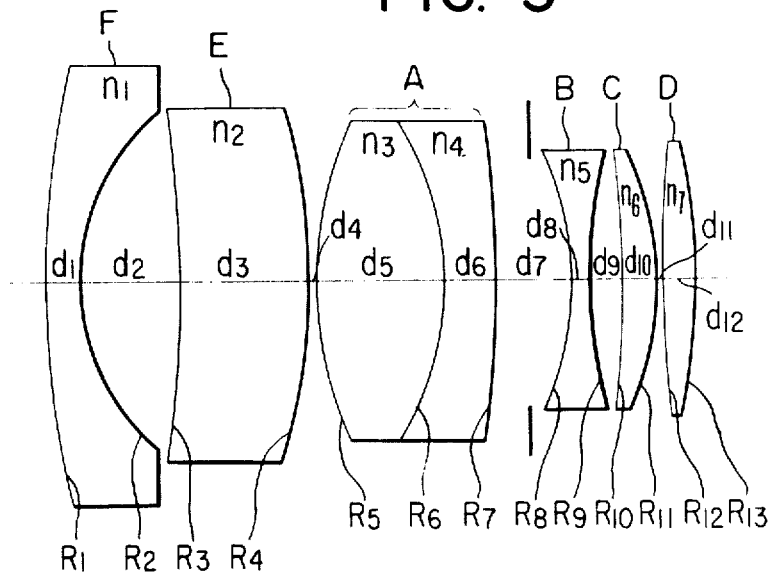
FIG. 3
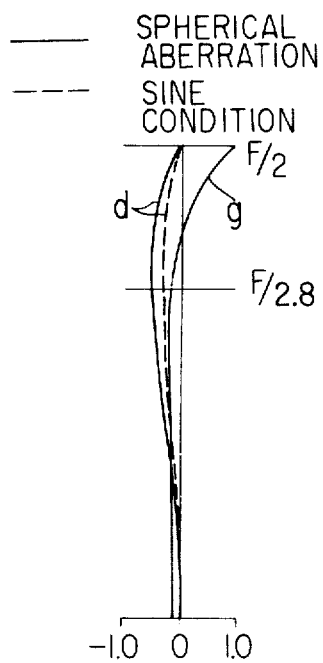
FIG. 4A
— SPHERICAL ABERRATION
--- SINE CONDITION
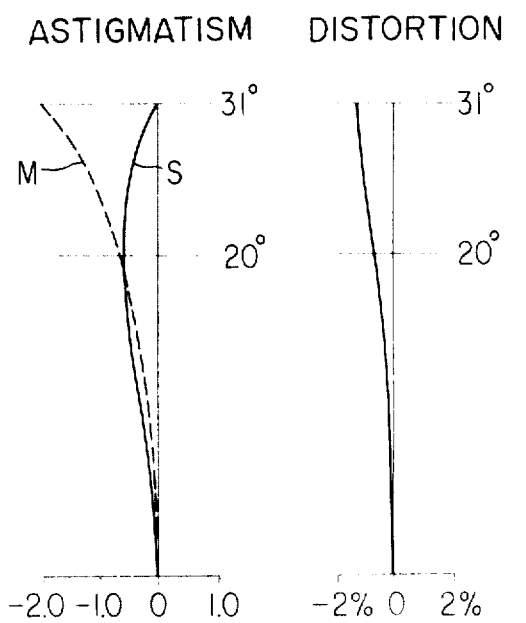
FIG. 4B  ASTIGMATISM
FIG. 4C  DISTORTION

SPHERICAL ABERRATION
--- SINE CONDITION

ASTIGMATISM

DISTORTION

— SPHERICAL ABERRATION
--- SINE CONDITION

ASTIGMATISM

DISTORTION

RETROFOCUS TYPE WIDE-ANGLE PHOTOGRAPHIC LENS

BACKGROUND OF THE INVENTION

1. Field of the Invention

This invention relates to a retrofocus type wide-angle photographic lens having a back-focus (hereinafter referred to as "B.f.") greater than the total focal length of the entire lens system.

2. Description of the Prior Art

In photographic lenses for single-lens reflex cameras with a reflecting mirror incorporated therein or in those for cinecameras, the B.f. must be greater than the total focal length of the entire lens system. In ordinary photographic lenses the B.f. is shorter than the focal length, and therefore, any short-focus lens having a focal length shorter than a predetermined value can not be used with those cameras which have limitations in the upward movement of the mirror and with regard to the distance from the rear of the lens system to the surface of the film. For this reason, so-called retrofocus type wide-angle lenses are employed. In the wide-angle photographic lenses of such type, however, difficulties are encountered in correcting the aberrations over a wide angle, and therefore, it is often the case that the maximum possible brightness is about F/3.5 for a wide-angle lens whose angle of view is about 74°, and about F/2.8 for a wide-angle lens whose angle of view is about 60°. Thus, in order to attain any higher brightness for a wide-angle lens, it would be necessary to increase the number of lens members, and accordingly the dimensions of lens systems is increased.

A wide-angle lens comprising six single lenses I to VI and having a brightness of F/3.5 and an angle of view amounting to 75° is known from Japanese Pat. No. 314,719 (Japanese Patent Publication No. 26,133/1963). According to this patent, there is arranged, in the direction from the diaphragm toward the image side, a biconcave lens, a positive meniscus lens having its concave surface facing the diaphragm and a positive lens, and in the direction from the diaphragm toward the object side, a biconvex lens III, a negative meniscus lens II having its concave surface facing the diaphragm, and a convex lens I.

SUMMARY OF THE INVENTION

In the lens system of the present invention, and with reference to the wide angle lens disclosed in the aforesaid Japanese Pat. No. 314,719, a positive lens is inserted between the single lenses II and III and nearer to the lens III so that the inserted lens may share the refractive power with the lens III to thereby increase the brightness of the entire lens system as well as to effect the correction of distortion. As a result, the single lens I is eliminated.

It is an object of the present invention to provide an optical system for a wide-angle lens which may comprise only seven components to attain a brightness of about F/2 for an angle of view of about 62° or a brightness of about F/2.8 for an angle of view of about 74°.

It is another object of the present invention to provide an optical system for a wide-angle lens which may comprise only six components to attain a brightness of about F/2.8 for an angle of view of about 60°.

These objects and other features of the present invention will become fully apparent from the following detailed description taken in conjunction with the accompanying drawings.

BRIEF DESCRIPTION OF THE DRAWINGS

FIGS. 1, 3, 5 and 7 are longitudinal sections of the lens systems according to Examples I, II, III and IV of the present invention. FIGS. 2A–2C, 4A–4C, 6A–6C, 8A–8C are graphs illustrating the abberations in the four Examples, respectively.

DESCRIPTION OF THE PREFERRED EMBODIMENTS

Figure 1:
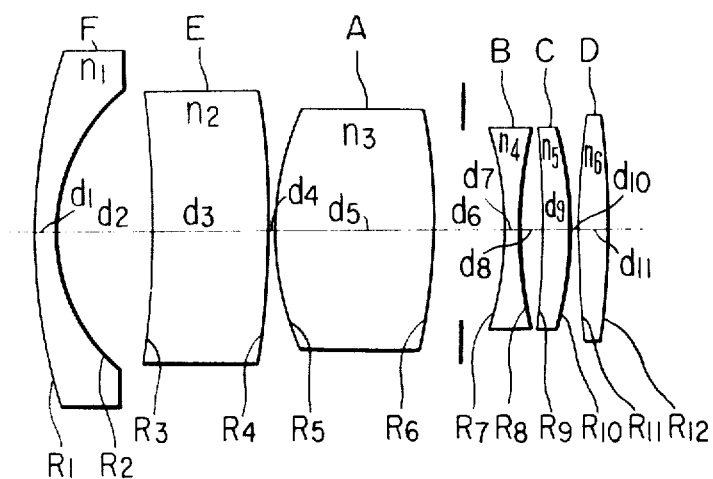
Figure 5:
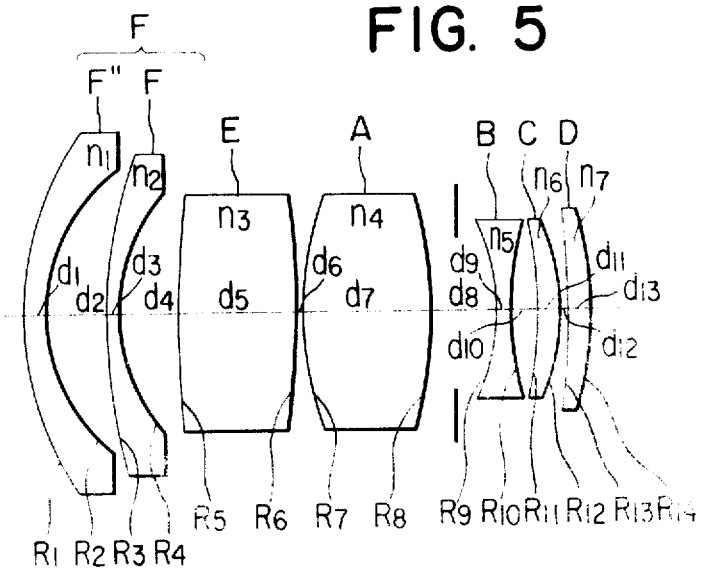
Figure 7:
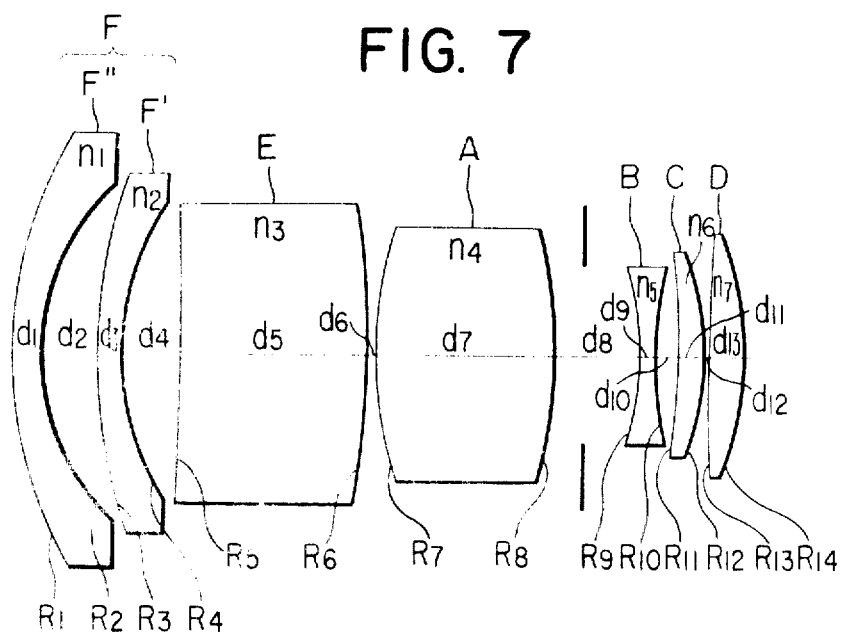

Referring to FIG. 1, an optical system according to a first embodiment of the present invention comprises, in the direction from the diaphragm toward the image side, a biconcave lens B, a positive meniscus lens C having its concave surface facing the diaphragm and a positive lens D, and in the direction from the diaphragm toward the object side, a biconvex lens A, a positive lens E and a negative meniscus lens F having its concave surface facing the diaphragm. The biconvex lens A may alternatively be a doublet, as is shown in FIG. 3, and this is particularly preferable where a lens of relatively large aperture is desired. It also holds true of all the other lenses B, C, D, E and F. The meniscus lens F may alternatively comprise two separate negative meniscus lenses F' and F'' both having their concave surfaces facing the diaphragm, as is shown in FIGS. 5 or 7, and this is particularly preferable where a wide-angle lens is desired.

The air spacing between the positive lens E and the biconvex lens A is less than one-third of the center thickness of the positive lens E. This means that the positive lens E and the biconvex lens A are closely adjacent to each other, and that surface of the positive lens E which is nearer to the biconvex lens A has a positive refractive power and therefore can share the refractive power with the biconvex lens A. These results contribute to an increase of brightness of the lens system. The refractive power of the surface of the positive lens E which is nearer to the diaphragm is not greater than the refractive power of that surface of the biconvex lens A which is remote from the diaphragm. Since the diaphragm lies behind the biconvex lens A, oblique rays passing through the positive lens E are refracted to a greater degree by that surface of the positive lens E which is nearer to the diaphragm, and this is effective for the correction of distortion. If, however, the refractive power of such surface of the lens E is greater than that of such surface of the positive lens A which is remote from the diaphragm, the image plane will be so much curved in the negative direction that it can no longer be corrected. On the other hand, incident rays parallel to the optical axis pass divergently through the positive lens E and therefore, the surface of the lens E nearer to the diaphragm, being rather aplanatic for these rays, is not effective for the correction of spherical aberrations of higher orders, and the surface of the objective of the biconvex lens A is more effective for the correction of spherical aberrations of higher orders. For all these reasons, it is required that the refractive power of the surface of the positive lens E which faces the image side shall not be greater than the refractive power of the surface of the biconvex lens A which faces the object side. Further, the center thickness of the positive lens E is greater than twice the center thickness of the negative meniscus lens F (in the case of the lenses F′ and F″, the sum of their center thicknesses, and hereinafter such sum is also meant by the "center thickness.")

As to the radius of curvature, the surface of the positive lens E which is remote from the diaphragm has a radius of curvature greater than the radius of curvature which provides an aplanatic relationship with respect to the oblique rays passed through the negative meniscus lens F. Where it is desired to make the lens system smaller in dimensions, a negative radius of curvature is preferred. Because of the indicated radius of curvature of the surface of the positive lens E which is remote from the diaphragm, those oblique rays passed through the negative meniscus lens F are refracted so as to be rather parallel to the optical axis after they have entered the positive lens E. Since the center thickness of the positive lens E is greater than twice the thickness of the negative meniscus lens F, those rays near to the optical axis increase their heights from the optical axis as they pass through the positive lens E. This is effective to elongate the back-focus while minimizing the effective aperture. Such tendency will be more pronounced if the radius of curvature of the surface of the positive lens E which is remote from the diaphragm is negative. However, when the positive lens E is replaced by a negative one, it will cause negative distortion and a great curvature of the image plane in the positive direction. Thus, the lens E must be a positive one.

Having satisfied all the foregoing conditions, the present invention provides a light-weight, compact, retrofocus type wide-angle photographic lens having a long back-focus which is bright and wide in angle of view and which has well corrected aberrations.

Various data for the lens systems embodying the present invention will be shown below. It is to be noted that in Example I, the effective aperture diameter for the radius of curvature R1 is equal to or less than 0.8 times the total focal length $f$, and in Example II, it is equal to or less than 1.1 times. In each table below, R represents the radius of curvature, $d$ the lens thickness or the interlens air spacing, $n$ the refractive index of the lens forming glass for d-line, and $vd$ the Abbe number of such glass.

Example I

Figure 2A:
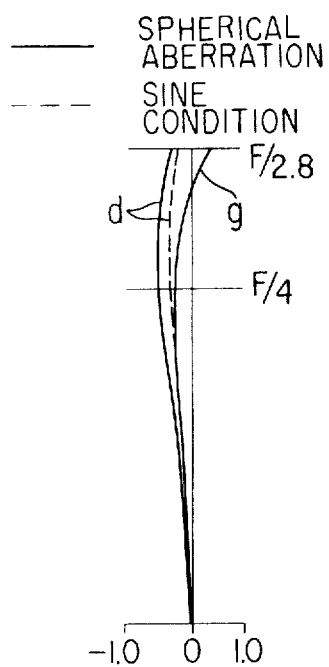
Figures 2B, 2C:
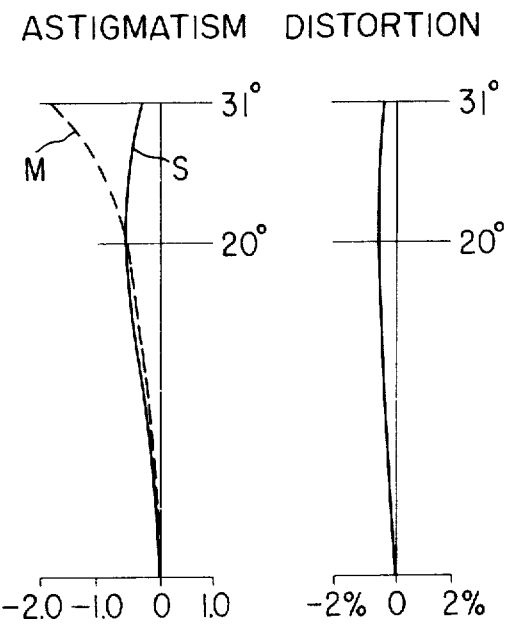

Total focal length f=100; B.f.=107.289;
Relative aperture F/2.8; Angle of view 62°
(see FIGS. 1–2)

| R | d | n | vd |
|---|---|---|---|
| R1 =+133.333 | d1 = 5.556 | n1=1.51454 | vd=54.6 |
| R2 =+ 42.083 | d2 =22.222 | | |
| R3 =−258.333 | d3 =27.778 | n2=1.51680 | vd=64.2 |
| R4 =−233.333 | d4 = 0.278 | | |
| R5 =+ 73.056 | d5 =37.500 | n3=1.71300 | vd=53.9 |
| R6 =−133.889 | d6 =17.222 | | |
| R7 =− 59.028 | d7 = 4.167 | n4=1.71736 | vd=29.5 |
| R8 =+116.667 | d8 = 3.750 | | |
| R9 =−123.611 | d9 = 7.500 | n5=1.74443 | vd=49.4 |
| R10=− 49.167 | d10= 0.278 | | |
| R11=+277.778 | d11= 6.944 | n6=1.62041 | vd=60.3 |
| R12=−188.669 | | | |

$$\frac{\text{center thickness of lens E}}{\text{center thickness of lens F}} = \frac{d3}{d1} = 4.9996$$

$$\frac{\text{center thickness of lens E}}{\text{air spacing between lenses A and E}} = \frac{d3}{d4} = 99.9208$$

Example II

Total focal length f=100; B.f.=107.7;
Relative aperture F/2; Angle of view 62°
(see FIGS. 3–4)

| R | d | n | vd |
|---|---|---|---|
| R1 =+186.111 | d1 = 8.333 | n1=1.51680 | vd=64.2 |
| R2 =+ 48.889 | d2 =23.611 | | |
| R3 =−240.833 | d3 =30.000 | n2=1.63854 | vd=55.5 |
| R4 =−174.167 | d4 = 0.278 | | |
| R5 =+ 83.333 | d5 =31.944 | n3=1.71300 | vd=53.9 |
| R6 =− 61.111 | d6 =12.222 | n4=1.62012 | vd=49.8 |
| R7 =−283.333 | d7 =18.056 | | |
| R8 =− 65.694 | d8 = 5.000 | n5=1.71736 | vd=29.5 |
| R9 =+131.944 | d9 = 6.944 | | |
| R10=−176.389 | d10= 8.333 | n6=1.71300 | vd=53.9 |
| R11=− 61.111 | d11= 0.278 | | |
| R12=+472.222 | d12= 7.778 | n7=1.62041 | vd=60.3 |
| R13=−111.708 | | | |

$$\frac{\text{center thickness of lens E}}{\text{center thickness of lens F}} = \frac{d3}{d1} = 3.6001$$

$$\frac{\text{center thickness of lens E}}{\text{air spacing between lenses A and E}} = \frac{d3}{d4} = 107.9136$$

Example III

Figure 6A:
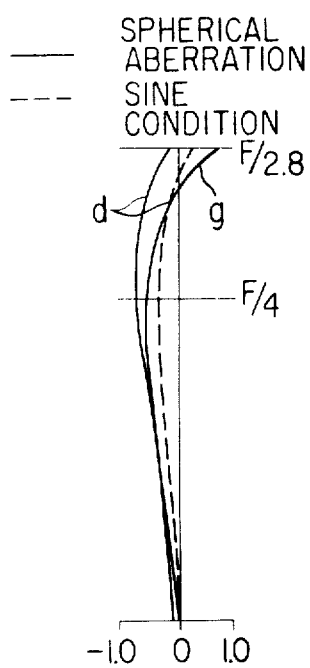
Figure 6B:
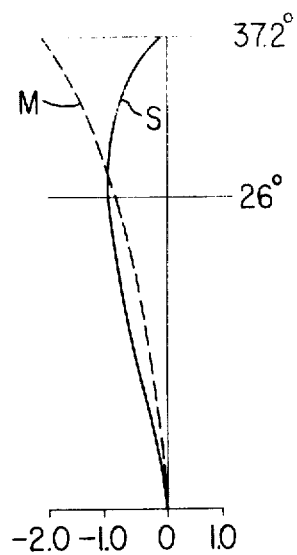
Figure 6C:
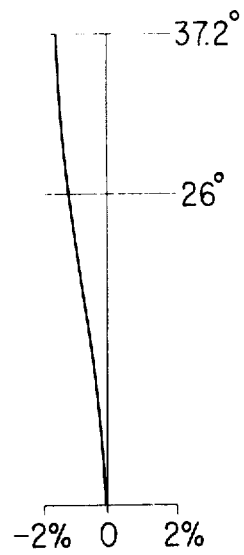

Total focal length f=100; B.f.=130.9
Relative aperture F/2.8; Angle of view 74.4°
(see FIGS. 5–6)

| R | d | n | vd |
|---|---|---|---|
| R1 =+ 94.312 | d1 = 6.971 | n1=1.62041 | vd=60.3 |
| R2 =+ 52.618 | d2 =13.942 | | |
| R3 =+ 121.721 | d3 = 5.228 | n2=1.62041 | vd=60.3 |
| R4 =+ 60.662 | d4 =19.170 | | |
| R5 =+1081.053 | d5 =34.855 | n3=1.51680 | vd=64.2 |
| R6 =− 396.420 | d6 = 0.350 | | |
| R7 =+ 105.863 | d7 =40.083 | n4=1.71300 | vd=53.9 |
| R8 =− 124.726 | d8 =20.223 | | |
| R9 =− 68.067 | d9 = 4.880 | n5=1.68893 | vd=31.1 |
| R10=+ 142.987 | d10= 4.880 | | |
| R11=− 181.617 | d11= 8.714 | n6=1.62041 | vd=60.3 |
| R12=− 62.060 | d12= 0.350 | | |
| R13=−1595.545 | d13=10.108 | n7=1.62041 | vd=60.3 |
| R14=− 85.403 | | | |

| center thickness of lens E | $= \dfrac{d5}{d1+d3} =$ | 2.8596 |
|---|---|---|
| center thickness of lens F | | |

| center thickness of lens E | $= \dfrac{d5}{d6} =$ | 99.5857 |
|---|---|---|
| air spacing between lenses A and E | | |

Example IV

Figure 8A:
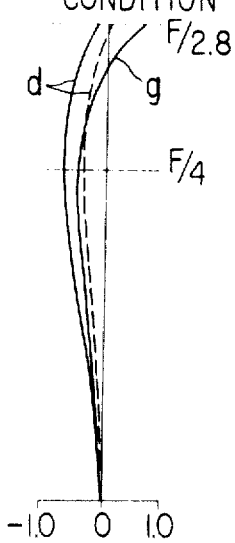
Figure 8B:
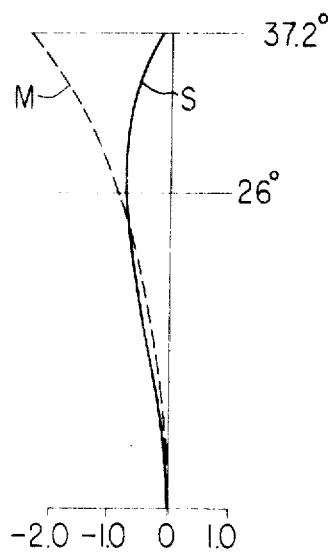
Figure 8C:
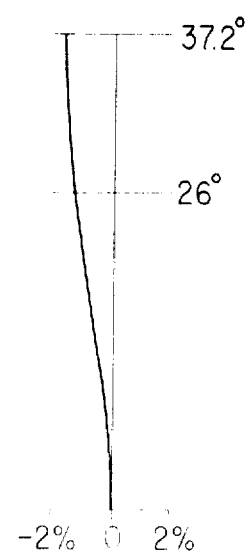

Total focal length f=100; B.f.=131.5;
Relative aperture F/2.8; Angle of view 74.4'
(see FIGS. 7-8)

| R1 =+ 125.874 | | | |
|---|---|---|---|
| | d1 = 9.09 | n1=1.62280 | νd=56.9 |
| R2 =+ 64.685 | | | |
| | d2 =15.035 | | |
| R3 =+ 150.350 | | | |
| | d3 = 6.294 | n2=1.62280 | νd=56.9 |
| R4 =+ 70.979 | | | |
| | d4 =18.182 | | |
| R5 =−2844.06 | | | |
| | d5 =56.643 | n3=1.51680 | νd=64.2 |
| R6 =− 258.741 | | | |
| | d6 = 0.350 | | |
| R7 =+ 113.986 | | | |
| | d7 =54.195 | n4=1.71700 | νd=47.9 |
| R8 =− 150.350 | | | |
| | d8 =24.126 | | |
| R9 =− 65.909 | | | |
| | d9 = 6.294 | n5=1.72825 | νd=28.3 |
| R10=+ 186.713 | | | |
| | d10= 5.245 | | |
| R11=− 174.825 | | | |
| | d11= 9.441 | n6=1.62041 | νd=60.3 |
| R12=− 64.685 | | | |
| | d12= 0.350 | | |
| R13=+1748.252 | | | |
| | d13= 7.343 | n7=1.62041 | νd=60.3 |
| R14=− 91.928 | | | |

| center thickness of lens E | $= \dfrac{d5}{d1+d3} =$ | 3.6819 |
|---|---|---|
| center thickness of lens F | | |

| center thickness of lens E | $= \dfrac{d5}{d6} =$ | 161.8371 |
|---|---|---|
| air spacing between lenses A and E | | |

It is believed that the advantages and improved results furnished by the retrofocus type wide angle photographic lens of the invention will be apparent from the foregoing description of several preferred embodiments of the invention. Various modifications and changes may be made without departing from the spirit and scope of the invention as sought to be defined in the following claims.

I claim:

1. A retrofocus type wide-angle photographic lens system having a back-focus longer than the total focal length thereof, said system comprising, in the direction from the diaphragm toward the image side of said system, a biconcave lens component, a positive meniscus lens component having its concave surface facing the diaphragm, and a first positive lens component, and in the direction from the diaphragm toward the object side of said system, a biconvex lens component, a second positive lens component, and a negative meniscus lens member having its concave surface facing the diaphragm, said system satisfying the conditions:

i. that the center thickness of said second positive lens component is from approximately two times to approximately five times the center thickness of said negative meniscus lens member and is from approximately one hundred times to approximately one hundred sixty times the air spacing between said second positive lens component and said biconvex lens component;

ii. that the refractive power of the surface of said second positive lens component which is nearer to said diaphragm is less than the refractive power of the surface of said biconvex lens component which is remote from said diaphragm; and iii. the surface of said second positive lens component which is remote from said diaphragm has a radius of curvature greater than the radius of curvature of an aplanatic surface with respect to oblique rays passed through said negative meniscus lens member.

2. A lens system as defined in claim 1, wherein said biconvex lens component comprises a doublet.

3. A lens system as defined in claim 1, wherein said negative meniscus lens member comprises two meniscus lenses having their concave surfaces facing the diaphragm.

4. A lens system as defined in claim 1, which has the data as follows:

f=100; B.f.=107.289; F/2.8; Angle of view 62°

| R1 =+133.333 | | | |
|---|---|---|---|
| | d1 = 5.556 | n1=1.51454 | νd=54.6 |
| R2 =+ 42.083 | | | |
| | d2 =22.222 | | |
| R3 =−258.333 | | | |
| | d3 =27.778 | n2=1.51680 | νd=64.2 |
| R4 =−233.333 | | | |
| | d4 = 0.278 | | |
| R5 =+ 73.056 | | | |
| | d5 =37.500 | n3=1.71300 | νd=53.9 |
| R6 =−133.889 | | | |
| | d6 =17.222 | | |
| R7 =− 59.028 | | | |
| | d7 = 4.167 | n4=1.71736 | νd=29.5 |
| R8 =+116.667 | | | |
| | d8 = 3.750 | | |
| R9 =−123.611 | | | |
| | d9 = 7.500 | n5=1.74443 | νd=49.4 |
| R10=− 49.1677 | | | |
| | d10= 0.278 | | |
| R11=+277.778 | | | |
| | d11= 6.944 | n6=1.62041 | νd=60.3 |
| R12=−188.669 | | | | where *f* denotes the focal length of the entire lens system, B.f. denotes back-focus, R denotes radius of curvature of the surface of lens, *d* denotes thickness of lens or air spacing between adjacent lenses, *n* denotes refractive index relative to d-line of the glass, and *ν* denotes Abbe number of the glass.

5. A lens system as defined in claim 1, which has the data as follows:

f=100; B.f.=107.7; F/2; Angle of view 62°

| R1 =+186.111 | | | |
|---|---|---|---|
| | d1 = 8.333 | n1=1.51680 | νd=64.2 |
| R2 =+ 48.889 | | | |
| | d2 =23.611 | | |
| R3 =−240.833 | | | |
| | d3 =30.000 | n2=1.63854 | νd=55.5 |
| R4 =−174.167 | | | |
| | d4 = 0.278 | | |
| R5 =+ 83.333 | | | |
| | d5 =31.944 | n3=1.71300 | νd=53.9 |
| R6 =− 61.111 | | | |
| | d6 =12.222 | n4=1.62012 | νd=49.8 |
| R7 =−283.333 | | | |
| | d7 =18.056 | | |
| R8 =− 65.694 | | | |
| | d8 = 5.000 | n5=1.71736 | νd=29.5 |
| R9 =+131.944 | | | |
| | d9 = 6.944 | | |
| R10=−176.389 | | | |
| | d10= 8.333 | n6=1.71300 | νd=53.9 |
| R11=− 61.111 | | | |
| | d11= 0.278 | | |

-Continued

R12=+472.222
R13=-111.708

| | d12= 7.778 | n7=1.62041 | νd=60.3 | where $f$ denotes the focal length of the entire lens system, B.f. denotes back-focus, R denotes radius of curvature of the surface of lens, $d$ denotes thickness of lens or air spacing between adjacent lenses, $n$ denotes refractive index relative to d-line of the glass, and $\nu$ denotes Abbe number of the glass.

6. A lens system as defined in claim 1, which has the data as follows:

f=100; B.f.=130.0; F/2.8; Angle of view 74.4°

| | | | |
|---|---|---|---|
| R1 =+ 94.312 | | | |
| | d1 = 6.971 | n1=1.62041 | νd=60.3 |
| R2 =+ 52.618 | | | |
| | d2 =13.942 | | |
| R3 =+ 121.721 | | | |
| | d3 = 5.228 | n2=1.62041 | νd=60.3 |
| R4 =+ 60.662 | | | |
| | d4 =19.170 | | |
| R5 =+1081.053 | | | |
| | d5 =34.855 | n3=1.51680 | νd=64.2 |
| R6 =− 396.420 | | | |
| | d6 = 0.350 | | |
| R7 =+ 105.863 | | | |
| | d7 =40.083 | n4=1.71300 | ν=53.9 |
| R8 =− 124.726 | | | |
| | d8 =20.223 | | |
| R9 =− 68.067 | | | |
| | d9 = 4.880 | n5=1.68893 | νd=31.1 |
| R10=+ 42.987 | | | |
| | d10= 4.880 | | |
| R11=− 181.617 | | | |
| | d11= 8.714 | n6=1.62041 | νd=60.3 |
| R12=− 62.060 | | | |
| | d12= 0.350 | | |
| R13=−1595.545 | | | |
| | d13=10.108 | n7=1.62041 | νd=60.3 |
| R14=− 85.403 | | | | where $f$ denotes the focal length of the entire lens system, B.f. denotes back-focus, R denotes radius of curvature of the surface of lens, $d$ denotes thickness of lens or air spacing between adjacent lenses, $n$ denotes refractive index relative to d-line of the glass, and $\nu$ denotes Abbe number of the glass.

7. A lens system as defined in claim 1, which has the data as follows:

f=100; B.f.=131.5; F/2.8; Angle of view 74.4°

| | | | |
|---|---|---|---|
| R1 =+ 125.874 | | | |
| | d1 = 9.09 | n1=1.62280 | νd=56.9 |
| R2 =+ 64.685 | | | |
| | d2 =15.035 | | |
| R3 =+ 150.350 | | | |
| | d3 = 6.294 | n2=1.62280 | νd=56.9 |
| R4 =+ 70.979 | | | |
| | d4 =18.182 | | |
| R5 =−2844.06 | | | |
| | d5 =56.643 | n3=1.51680 | νd=64.2 |
| R6 =− 258.741 | | | |
| | d6 = 0.350 | | |
| R7 =+ 113.986 | | | |
| | d7 =54.195 | n4=71700 | νd=47.9 |
| R8 =− 150.350 | | | |
| | d8 =24.126 | | |
| R9 =− 65.909 | | | |
| | d9 = 6.294 | n5=1.72825 | νd=28.3 |
| R10=+ 186.713 | | | |
| | d10= 5.245 | | |
| R11=− 174.825 | | | |
| | d11= 9.441 | n6=1.62041 | νd=60.3 |
| R12+− 64.685 | | | |
| | d12= 0.350 | | |
| R13=+1748.252 | | | |
| | d13= 7.343 | n7=1.62041 | νd=60.3 |
| R14=− 91.928 | | | | where $f$ denotes the focal length of the entire lens system, B.f. denotes back-focus, R denotes radius of curvature of the surface of lens, $d$ denotes thickness of lens or air spacing between adjacent lenses, $n$ denotes refractive index relative to d-line of the glass, and $\nu$ denotes Abbe number of the glass.

* * * * *